Sept. 15, 1931.    J. T. WRIGHT ET AL    1,823,223
CLUTCH
Filed July 20, 1925    2 Sheets-Sheet 1
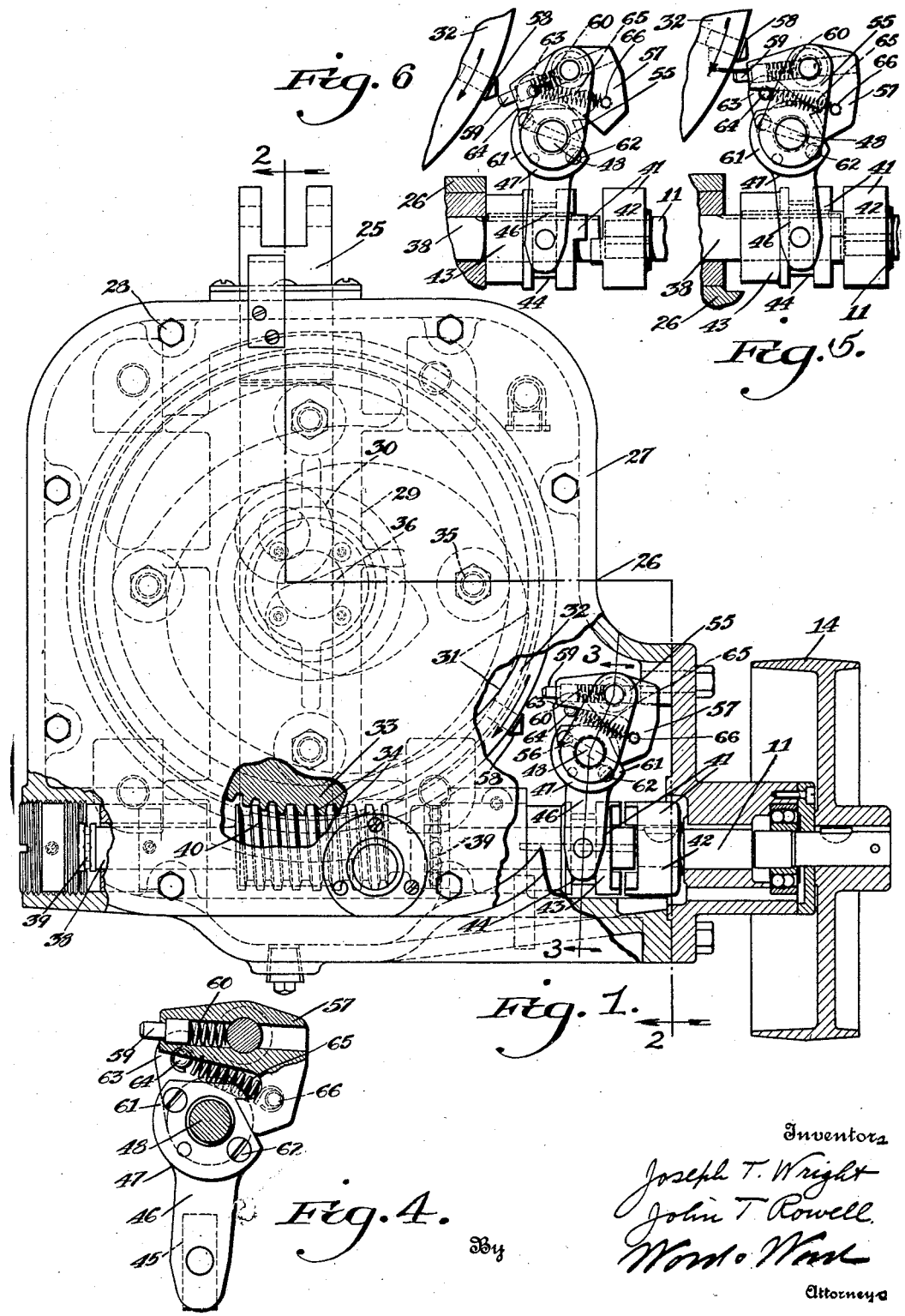
Inventors
Joseph T. Wright
John T. Rowell

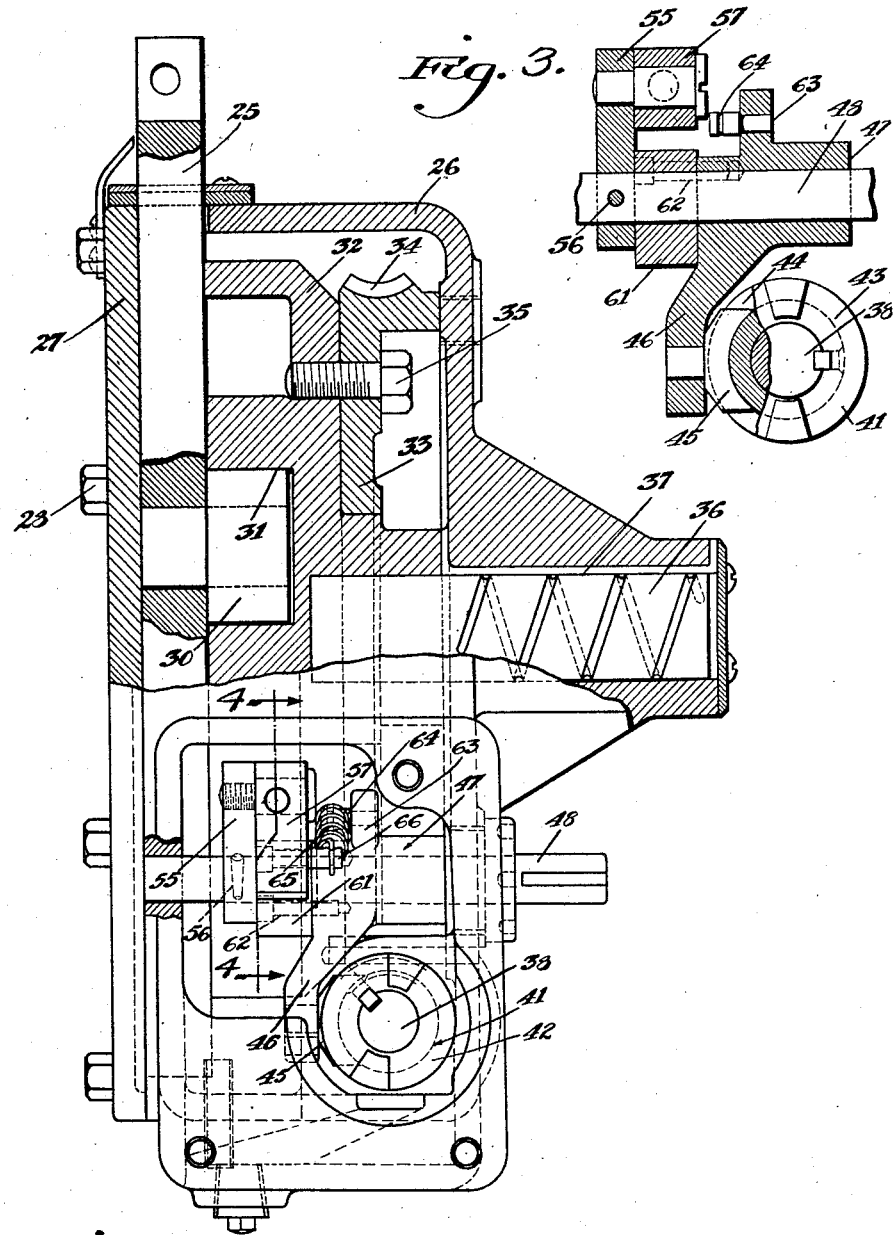

Patented Sept. 15, 1931

1,823,223

UNITED STATES PATENT OFFICE

JOSEPH T. WRIGHT AND JOHN T. ROWELL, OF CINCINNATI, OHIO, ASSIGNORS, BY MESNE ASSIGNMENTS, TO THE HARRIS-SEYBOLD-POTTER COMPANY, OF CLEVELAND, OHIO, A CORPORATION OF DELAWARE

CLUTCH

Application filed July 20, 1925. Serial No. 44,704.

Our invention relates to clutch mechanism primarily for transmission control of a paper drilling machine.

An object of the invention is to provide a clutch adapted to be thrown and held into clutching position by a depressible treadle and capable of being automatically declutched at the end of a working cycle while the clutch actuating pressure is still maintained upon the treadle or part manually actuating the clutch.

Other objects and certain advantages will be more fully set forth in the description of the drawings forming a part of this specification, in which:

Figure 1 is an enlarged detail view of the unit of mechanism containing the features of the invention for reciprocating the table of the machine.

Figure 2 is a sectional view taken on line 2—2, of Fig. 1, detailing the table reciprocating means.

Figure 3 is a sectional view taken on line 3—3, of Fig. 1, detailing the power of cut-off for automatic control of the movement of the table.

Figure 4 is a sectional view taken on line 4—4, of Fig. 2, detailing the automatic power cut-off.

Figure 5 is a view taken the same as Fig. 1 showing the clutch in and the power cut-off in position to be tripped by the table reciprocating cam.

Figure 6 is a view taken the same as Fig. 5 showing the power cut-off tripped, and the clutch thrown out.

The clutch is particularly adapted for a type of drilling machine as shown and described in Letters Patent No. 1,347,214 in which a work supporting table is reciprocated vertically toward and from a stationary drill carrying headstock. The work table or part to be actuated is connected with a pitman 25 slidably mounted within a housing or casing 26 suitably attached to the frame of the machine. The housing is provided with a cover plate 27 secured in place by bolts 28 and the inner side of the cover plate provides a guideway 29 in which the pitman 25 is adapted to reciprocate. Secured to this pitman 25 is a roller 30 which fits into the cam groove 31 of a cam wheel. This cam wheel comprises two parts, the cam face 32 and gear portion 33 which is provided on its edge with gear teeth 34. These two parts are secured together by bolts 35. The cam wheel is secured to a shaft 36 which is journaled in a bearing 37 in the housing. The cam groove is shaped to impart a uniform motion to the table during the actual drilling operation in order to insure maximum efficiency of the drill and prevent the burning of the paper.

Below the cam wheel is a shaft 38 journaled in the housing by means of ball bearings 39. This shaft is provided with a worm 40 which cooperates with the gear teeth of the cam wheel to transmit motion thereto. This shaft 38 is axially aligned with the power shaft 11 which extends through the housing and is journaled therein, and between the ends of these shafts is a clutch 41 adapted to rotatively connect them. The power shaft 11 at its outer end carries a pulley 14.

Keyed to the inner end of shaft 11 is a collar 42 which is provided with two clutch teeth projecting from its face. Splined to the end of shaft 38 is a toothed collar 43 complementary to collar 42 and adapted to interlock therewith in clutching relationship. The collar 43 is also provided with a circumferential groove 44 in which fits the clutch shifting yoke 45. This yoke is pivoted to the lever arm 46 of what may be best described as a clutch shifting member 47. This member is rotatively mounted on a rock shaft 48 extending at right angles to power shaft 11 and also journaled in the housing and extending beyond the same in the rear.

Extending above the rock shaft is a lever 55 secured thereto by a pin 56. Pivoted to the top of the lever is a pawl 57 adapted to be tripped by a stud 58 on the edge of the cam wheel. This pawl 57 is provided with a counterbored aperture in which is located a headed pin 59, pressed outwardly by a spring 60 under compression. It is this pin which is actually contacted by the stud 58 and the yieldable mounting is provided to permit this member to move toward the wheel as the clutch is thrown in even if the stud has not been carried on out of the way by the inertia of the wheel after the last operation. This yieldable feature does not interfere with positive tripping because the trip is tangential with relation to the cam whereas the yield is nearly radial.

The pawl is adapted to engage a notched collar 61 loosely mounted on the rock shaft and connect the two rotatively together. This collar is connected by screws 62 rotatively to the clutch shifting member 46 of which it is really a part.

Extending upwardly from the clutch shifting member is a lever 63 with a pin 64 extending therefrom. A tension spring 65 extends between this pin and a pin 66 located on the pawl at such a point that the spring normally holds the pawl in engagement with the notch but when the pawl is tripped the spring tends to pull the members together. Since the foot of the operator is on the treadle when the pawl is tripped, the rock shaft cannot rotate. The spring therefore rotates the clutch throw-out member which operates the splined collar on the worm shaft and withdraws the collar from connection with the complementary collar on the power shaft, thereby cutting off the power. After the power is off, the foot of the operator is removed from the treadle and the rock shaft impelled by tension of a spring rotates back so that the pawl engages the notch and the clutch can be thrown in by the treadle. By taking the foot off of the treadle the operation of the machine can be stopped at any desired point in its cycle of operation.

Having described our invention, we claim:

1. A device of the class described, comprising a driven shaft, means actuated thereby including a rotative member having a stud extending therefrom, a power shaft, a clutch between said power shaft and said first mentioned shaft, a rock shaft, a clutch shifting member loosely mounted on said rock shaft, a notch on said clutch shifting member, a lever on said rock shaft, a pawl on said lever adapted to engage said notch and rotatively connect the clutch shifting member to the rock shaft to throw in the clutch, a yieldably mounted pin carried by the pawl, the stud on said rotative member adapted to engage the pin and trip the pawl thereby disengaging the pawl from the notch in the clutch shifting member, a spring between the pawl and clutch shifting member adapted to rotate the clutch shifting member and throw out the clutch when the pawl is tripped, and means for operating said rock shaft.

2. In a machine of the class described, a housing, a driven wheel in said housing, a power shaft extending through the housing, complementary clutch members rotatively connected with said power shaft and said driven wheel, a rock shaft and a clutch shifting member loosely mounted thereon, a lever on said rock shaft, a pawl pivoted to said last mentioned lever, a notch in said clutch shifting member adapted to be engaged by said pawl to connect the members rotatively for clutch engagement, a stud carried by the driven wheel adapted to engage and trip the pawl thereby disconnecting the pawl and clutch shifting member, a spring under tension between the pawl and clutch shifting member, said spring adapted to rotate the clutch shifting member and throw out the clutch.

In witness whereof, we hereunto subscribe our names.

JOSEPH T. WRIGHT.
JOHN T. ROWELL.